Patented Sept. 4, 1951

2,566,362

UNITED STATES PATENT OFFICE 2,566,362

HARDENING AND DECOLORIZING GLYCERIDE OILS WITH NICKEL-ALUMINA-SILICA CATALYSTS

William J. Paterson, Newton Highlands, Mass., assignor to Lever Brothers Company, Cambridge, Mass., a corporation of Maine No Drawing. Application November 1, 1947, Serial No. 783,620

7 Claims. (Cl. 260—409)

The present invention relates to the preparation of improved products from glyceride oils which are susceptible to improvement in stability against rancidity, color or odor development, or any two or more thereof. More particularly, the invention relates to a novel treatment of glyceride oils with hydrogen in the presence of nickel-alumina-silica catalysts to provide an improved product with respect to color, odor, plasticity and stability. It also relates to the catalysts used and to methods of preparing the catalysts.

The invention is particularly directed to the simultaneous hydrogenation (hardening) and decolorizing of glyceride oils with hydrogen in the presence of a nickel-alumina-silica catalyst under the pressure and temperature conditions usually used with nickel metal hydrogenation catalysts. The unexpected advantages of the invention are associated with the discovery of nickel-alumina-silica catalysts of relatively high nickel content which are very efficient for decolorizing, and are of such a particulate (non-colloidal) nature or form that they may be maintained as a suspended powder in the glyceride during the decolorizing; and are readily and substantially completely removable from the hardened and decolorized glyceride; e. g., by filtration. This is a marked departure from heretofore proposed voluminous, colloidal, hydrogel catalysts, such as those prepared from nickel chloride, magnesium chloride and waterglass at a temperature not exceeding 60° C. Such prior art catalysts have a relatively low nickel content and are in the form of an extremely fine, light and loose powder, and are not readily removable from the glyceride by filtration, and thus are highly disadvantageous from the commercial viewpoint. The discovery is also a marked departure from prior art catalysts prepared from sulfate of nickel, sulfate of alumina, waterglass and a nitrogenous protective colloid such as a caustic soda solution of wool. These prior art catalysts have a relatively low nickel content and are of a colloidal nature; they, too, are subject to the above-mentioned drawbacks.

Glyceride oil products are prepared in accordance with the usual practice from crude oils which are generally dark in color and contain a substantial amount of undesirable impurities, such as free fatty acids, gums, mucilaginous material, and the like. Moreover, these oils are normally odoriferous and otherwise objectionable, particularly when the object is to use them as edible substances, for example, for culinary purposes. Heretofore, the crude oil generally has been subjected to a series of refining, bleaching, hydrogenating and deodorizing operations to remove objectionable constituents from the oil and to improve its stability, color, odor and flavor. The particular procedure followed and the severity of the treatment depends to a large extent upon the type and initial purity of the crude oil as well as the desired characteristics of the final product.

In general, the initial refining of the oil is accomplished by subjecting the oil to a treatment with caustic alkali, which neutralizes and precipitates the free fatty acids as soaps. At the same time, a substantial proportion of the gums, mucilaginous materials, and coloring matter is coagulated and removed along with the fatty acid soaps. This treatment may be repeated if desired.

Further, in accordance with the art of preparing glyceride oil products, the refined oil is generally improved in color by a subsequent bleaching treatment with a usual bleaching agent of the carbon or earth type. The bleaching agents, it is believed, effect a decolorizing action by adsorbing coloring matter from the oil. The bleaching agents and the adsorbed coloring matter are then removed from the oil by filtration. It has been observed that bleaching agents also absorb a substantial amount of oil, and that factor, in addition to the relatively high cost of satisfactory bleaching agents, and the difficulty and expense of filtration and so forth, adds greatly to the expense involved in manufacturing glyceride oil products.

When a hardened product for use in shortening, for example, is desired, the refined and bleached oil is hydrogenated by means of hydrogen gas in the presence of a metallic catalyst such as nickel and generally at elevated temperatures.

The refined and bleached oil, either hydrogenated or unhardened, may then be deodorized by subjecting the oil to a treatment with steam under reduced pressure conditions.

In accordance with the invention, it has been found that if an aqueous solution of a water-soluble nickel salt and a water-soluble aluminum salt is treated with an aqueous solution of an alkali metal silicate and then with a solution of an alkali carbonate, preferably bicarbonate, using certain proportions of reactants and certain conditions of reaction, there is obtained a precipitate (precursor of the catalyst); from which, after washing out the soluble salts, drying, pulverizing, and reducing with hydrogen, a catalyst is obtained which is especially suitable for the hardening and decolorizing of glyceride oils. The precursor and the catalyst are in a non-colloidal, particulate form, and may be readily filtered. This permits the catalyst to be readily and completely removed by filtration from the hardened and decolorized glyceride.

The objects achieved in accordance with the invention include the provision of a process of manufacturing good grade products from glyceride oils, wherein the refined oil is submitted to a simultaneous hardening and decolorization by treatment with hydrogen in the presence of a non-colloidal, particulate, nickel-alumina-silica catalyst; the provision of a non-colloidal, particulate, nickel-alumina-silica catalyst which is adapted for the hardening and decolorizing of glyceride oils, and is in such a form that it may be readily and substantially completely removed from the glyceride oil by filtration; the provision of a method of preparing a non-colloidal, particulate, nickel-alumina-silica catalyst which is adapted for the hardening and decolorizing of glyceride oils, and is in such a form that it may be readily and substantially completely removed from the glyceride oil by filtration; and other objects which will be apparent as details or embodiments of the invention are set forth hereinafter.

The catalyst of the invention has the following commercially desirable characteristics:

Low cost

The ingredients and the processing operations, including labor requirements, are of relatively low cost.

Easily handled

The nickel-alumino-silicate-carbonate (i. e., the reducible precursor of the catalyst) is in a form which is easily handled by relatively simple and available techniques and equipment. This is to be contrasted with the requirements of a precursor which is in the form of a very voluminous hydrogel which is difficult to filter and wash by conventional filter-press procdures. It is also to be contrasted with the exceptionally large dryer capacity required for a bulky hydrogel catalyst or their precursors. In addition, the reducible precursor prepared in accordance with the invention is readily comminuted to the desirable particle size prior to reduction. This is to be contrasted with undesirable materials which are so hard, glassy, and dense that they are difficult to comminute to the desired particle size.

Optimum sedimentation properties

The finished catalyst prepared in accordance with the invention is sufficiently light to permit the maintenance of a desirable suspension of the catalyst in the oil being hardened and decolorized, with usual agitation. At the same time, it is not of too small a mean particle size, and can be readily and substantially completely removed from the oil after the hardening and decolorizing operation. This is to be contrasted with materials which are too dense to be maintained in ready suspension in the oil, or are of too small a mean particle size (e. g., of a colloidal or semi-colloidal nature) to permit easy and substantially complete removal of the catalyst from the treated oil by usual filtration methods. In addition, the catalyst particles are sufficiently strong to resist the crushing and abrasive forces which occur during the hardening and decolorizing operation and the subsequent treatments.

Active

The catalysts prepared in accordance with the invention are desirably active for the hydrogenation and decolorizing of glyceride oil and are resistant to the so-called catalytic poisons sometimes associated with the hydrogen, or with the glyceride oil, or both.

Selective

The catalysts of the invention are selective in that they tend to direct the hydrogenation of the polyolefinic components of the oil (such as the linoleic and linolenic acid components) to the mono-olefinic type of component (such as oleic acid components) without undue formation of the completely saturated materials (such as stearic acid); that is, the catalyst is preferentially selective.

Iso-suppressive

The catalysts prepared in accordance with the invention are iso-suppressive; that is, they tend to prevent the occurrence of the relatively hard and higher melting isomers of the naturally occurring oleic acid group, in the selective hydrogenation of the poly-olefinic acid groups to the mono-olefinic acid groups. It also tends to repress any isomerization of the original mono-olefinic acid groups, such as oleic acid groups, in the glyceride oil into higher melting forms, such as elaidic acid. The presence of these isomers is undesirable inasmuch as they tend to make the product unduly hard, for a product of a given degree of unsaturation. The higher melting isomers are associated with poor consistency or plasticity characteristics of the hardened and decolorized oil. This is reflected in too rapid softening and loss of "body" of the fat when it is subjected to increasing temperature conditions; this manifests itself in practice in the relatively bad culinary properties of shortening, such as in cake making.

Decolorize

The catalysts prepared in accordance with the invention remove lipid pigments from the glyceride during the hydrogenation, giving a product of a light color and desirable hue. When a refined unbleached oil, such as soybean or cottonseed oil (having a Lovibond color in a 5¼ inch column of from about 35Y-5.0R to 70Y-14.0R), is hydrogenated with a conventional nickel metal catalyst, there is some reduction of the color density of the oil, but the product possesses varying degrees and hues of green color, and this is not a desirable color for an edible fat. In contrast to such a catalyst, the catalysts of the invention remove far more color from the oil than does the nickel metal catalyst, giving a product which is light colored to water-white; and in which the residual color is sufficiently balanced in its spectral characteristic to be attractive to the consumer. The finished material has a color not greater than 20Y-2.0R, and preferably not greater than 10Y-1.0R. The balance or ratio of the Y (yellow) to the R (red) is not greater than 10 to 1. A product of higher ratio, e. g., 10Y-0.1R, may appear light in respect to light transmission, but has an undesirably greenish hue. The balance is not so high on the red side as to give a distinct reddish hue.

Standardized procedures were used in testing typical catalysts prepared in accordance with the invention, as described more fully hereinafter. 125 gram portions of oil were used. Hydrogenations were performed at 150° C. at atmospheric pressure, and with standardized agitation. The amount of the catalyst is selected so that the weight of nickel in the catalyst is 0.10% based on the weight of the oil. Typical alkali refined vegetable oils were used. The performance of the catalyst was judged by direct comparison with the performance of one of the best, commercially successful, nickel metal catalysts; the activity being measured by the time (in minutes) required to hydrogenate the oil to an I. V. of 70. The color determinations were made by the Wesson method, using Lovibond glasses and 5¼ inch oil columns. The colors were measured in terms of the yellow and the red glasses, which most nearly matched the color of the sample. In cases where a reasonable color match could not be obtained by use of the yellow and red glasses, color is denoted as "green."

The selectivity of hydrogenation of the catalyst is determined by analyzing for the amount of residual linoleic acid in the test sample, after hydrogenation to 70 I. V.; and comparing this I. V. with the I. V. of a correspondingly hydrogenated sample of the same oil to the same amount of residual linoleic acid, using the standard nickel metal catalyst. The amount of residual linoleic acid is determined according to the 1946 A. O. C. S. official methods (Cd 1–25 and Cd 2–38) involving the relationship between iodine and thiocyanogen values (I. V. and T. V.). The selectivity is rated in terms of iodine values. A rating of +5.0 I. V. means that the oil hydrogenated with the catalyst being tested is 5.0 I. V. units higher than that of the corresponding oil hydrogenated with the nickel metal catalyst to the same residual linoleic acid content.

The iso-suppressivity of hydrogenation, of the catalyst, is determined by comparing the penetration in one-tenth millimeters of a standardized needle dropped from a height of 2 cms. into the hydrogenated material (of 70 I. V.), after the latter has been chilled, aerated and tempered (i. e., allowed to stand until the penetration does not change with time, at a fixed temperature); and comparing this I. V. with the I. V. of a correspondingly prepared sample of the same glyceride after a duplicate hydrogenation to the same penetration using the standard nickel metal catalyst. The penetration is measured at 70° F. The higher the amount of solid glycerides, the lower will be the penetration. The iso-suppressivity is rated in terms of I. V. A rating of +2 I. V. means that the oil hydrogenated with the catalyst being tested is 2.0 I. V. units lower than a sample of the same oil hydrogenated to the same degree of hardness (that is, the same penetration value) with the standard commercially used nickel metal catalyst.

The filterability of the catalyst from the hydrogenated glyceride oil is determined by comparing the time required to filter an entire test batch of 125 grams of oil through a 9 cm. No. 42 (Whatman grade) filter paper held on a 9 cm., steam-jacketed Buchner funnel, under the suction from a high capacity vacuum pump. No filter-aid is employed. The oil is cooled to 100° C. before starting filtration. The filter is maintained at this temperature by means of the steam jacket. A good catalyst should filter from the oil sample under the test conditions in not longer than about 200 seconds, and the filtrate should be substantially free from semi-colloidal particles.

In order to facilitate understanding of the invention, the following specific embodiments thereof are included. These are for illustrative purposes only and are not to be construed as limitations of invention as otherwise disclosed and claimed herein (all parts and percentages are by weight unless otherwise specified):

EXAMPLE I SERIES

Nickel chloride ($NiCl_2.6H_2O$) in an amount of 23.8 parts and 4.8 parts of aluminum chloride ($AlCl_3.6H_2O$) are dissolved in 1000 parts distilled water at exactly 85° C. and rapidly agitated with turbine-type agitation. To this solution, a solution of 19.2 parts of sodium silicate (38.9% $Na_2O \cdot 3.23SiO_2$ and 61.1% $H_2O$) in 200 parts distilled water is slowly sprayed over the surface of the above mixture in such a manner that the silicate solution falls in individual droplets. Immediately following this, a solution of 19.2 parts sodium bicarbonate ($NaHCO_3$) dissolved in 800 parts distilled water is added in the same manner. The temperature is maintained at exactly 85° C. throughout the mixing and addition of reactants. The latter two reactants are added over a period of about 1 to 2 hours.

The precipitate is immediately filtered and washed, and the green filter cake is thoroughly dried at 105–110° C. The dried material is then carefully pulverized, just sufficiently so that it will all pass readily through a standard 120 mesh screen. The palpable powder is then reduced with pure hydrogen at 500° C. for about 2 hours. The reduced catalytic material is cooled to about 100° C. or below, and then mixed with refined and bleached coconut oil, while maintained in an atmosphere of hydrogen, or pure carbon dioxide, or an inert gas.

The precipitate is particulate in character (and seemingly crystalline); and it filters very easily and rapidly from the suspension. It is readily washed free from water-soluble salt on the filter, and there is no need to resort to the complicated sedimentation and decantation procedures such as are necessary with highly colloidal materials. The dried precipitate is fairly soft and easily pulverized and screened to a fine, palpable powder of about 0.20 bulk density (all through 120 mesh), and it is not hard and glassy or too voluminous. The filtrate and washings from the precipitate are bright and clear and essentially free from nickel, alumina and silica.

The reduced catalyst contains 46.5% nickel, 8.1% alumina and 45.4% silica. It is suspended in the protection oil at a 35% total solids-in-oil suspension which contains an amount of nickel equal to 16.3% of the weight of the suspension.

The hardening and decolorizing efficiency of this catalyst (1) is illustrated by the results set forth in the following table.

Table A

| Run Number | (a) | (b) | (c) |
|---|---|---|---|
| Soybean Oil Type | Expeller | Expeller | Extracted. |
| Color of Oil: | | | |
| Before Hydrogenation— | | | |
| Yellow | 70Y | 70Y | 70Y. |
| Red | 9.5R | 9.5R | 7.5R. |
| After Hydrogenation— | | | |
| Yellow | 3Y | 2Y | 2Y. |
| Red | 0.3R | 0.2R | 0.2R. |
| Hydrogenation Time (in minutes) | 25 | 28 | 27. |
| Catalyst Rating (Comparative to Standard): | | | |
| Selectivity (in I. V. units) | +0.2 | +7.1 | +4.7. |
| Iso-Suppressivity (in I. V. units) | +2.8 | +2.2 | +2.0. |

The catalyst shows superior ratings as to both selectivity and iso-suppressivity than the standard nickel metal catalyst. This standard is one of the best commercially used nickel metal catalysts; therefore, the ratings probably would be even better if based on ordinary nickel metal catalysts.

It is clear from the foregoing data that the hardened and decolorized soybean oils are far lighter than is generally required for the whitest shortening products (i. e., lighter than about 10Y–1.0R). The yellow and red colors of all these hydrogenated products are balanced, and the products have no greenish hue. As a comparison, samples of the same refined oils, hydrogenated under the same conditions with standard commercially used nickel metal catalysts, are very dark and green. Their color cannot be expressed properly in terms of yellow and red Lovibond glasses.

Following similar procedures, refined cottonseed oil was hydrogenated and decolorized with the catalyst (1) (e. g., a 35Y–6.7R oil gave a 13Y–1.3R product), and the bleaching effect obtained was comparable to the bleaching obtained with 6% official fuller's earth for 5 minutes at 110° C. (A. O. C. S. official method Cc8a–46).

The catalyst (1) filters readily and substantially completely from the hydrogenated product. Six analogous catalysts were prepared by the same procedure, with variations in the time of precipitation (between about one and two hours precipitation time). When similarly tested, and subjected to the filtration test, the hydrogenated oil (separated from the catalyst) in a period within 125–150 seconds, and the filtrates were all bright and clear.

EXAMPLE II SERIES

The filtration rates of the catalysts, prepared in accordance with the invention, may be increased by substituting a diatomaceous earth filter-aid for up to about 50% and even up to about 80% of the $SiO_2$ content of the catalysts, without adversely affecting the other desirable attributes of the catalysts. The filtering rates of typical catalysts, prepared in accordance with the procedure in Example I, except that the indicated amounts of diatomaceous earth filter-aid were included (in place of part of the silica), are indicated in the following table.

Table B

| Catalyst Number | (1) | (2) | (3) |
|---|---|---|---|
| Catalyst Formula (in weight per cent): | | | |
| Ni | 46.5 | 46.5 | 46.5 |
| $Al_2O_3$ | 8.1 | 8.1 | 8.1 |
| $SiO_2$ | 45.4 | 22.6 | 11.3 |
| Diatomaceous Earth Filter-Aid (per cent) | 0.0 | 22.8 | 34.1 |
| Filtering Time (in seconds) | 100 | 45 | 50 |

These catalysts show the same desirable hydrogenation attributes as indicated under Example I. The catalysts (2) and (3) show a shorter filtering time than catalyst (1); it is evident that substitution of about half of the silica (from sodium silicate) by the diatomaceous earth gives a good catalyst.

EXAMPLE III SERIES

The temperature of the precipitation is very critical. This is illustrated by the following catalysts, prepared in accordance with the procedure of Example I, except that the temperature of precipitation was varied as indicated.

Table C

| Catalyst Number | (4) | (5) | (6) | (7) |
|---|---|---|---|---|
| Precipitation Temperature (in °C.) | 70 | 80 | 90 | 100 |
| Dried Precipitate (Nickel-Alumino-Silicate): | | | | |
| Hardness | Hard, friable | Sl. Hard, friable | Soft | V. Soft, bulky |
| Bulk Density of Powder (all through 120 mesh) (in kgs./liter) | 0.36 | 0.28 | 0.11 | 0.06 |
| Time for Hydrogenation of 125 grams Refined Soybean Oil to 70 I. V. (in minutes) | 55 | 55 | 35 | 33 |
| Filtering Time of Catalyst from Hydrobleached Oil (in seconds) | Block at 315 (84% filtered) | 240 | 180 | 170 |

Desirable catalysts are prepared by precipitation at a temperature of at least 80° C., desirably in the range of 80° to 90° C., and preferably about 85° C. The hydrogenation time decreases, as the precipitation temperature increases; and the filtration time of the catalyst from the hydrogenated oil decreases as the precipitation temperature increases. At higher precipitation temperatures, the precipitate tends to become too voluminous (too low a bulk density) to give a catalyst having optimum commercial application, although the catalyst filters satisfactorily. At precipitation temperatures lower than 75° C., the precipitates tend to have a colloidal or hydrogel characteristic, and become more difficult to filter and wash; and the dry filter cake tends to be hard and resistant to comminution.

EXAMPLE IV SERIES

The rate of precipitation also influences the characteristics of the catalyst. This is illustrated by the following catalysts which were prepared in accordance with the procedure of Example I, except that the time of addition of the second precipitant was varied as indicated.

Table D

| Catalyst Number | (8) | (9) | (10) | (11) | (12) |
|---|---|---|---|---|---|
| Time of Addition of $NaHCO_3$ (in minutes) | 10 | 60 | 80 | 90 | 120 |
| Bulk Density of Dried Powdered Precipitate (all through 120 mesh) (in kgs./liter) | 0.39 | 0.23 | 0.12 | 0.10 | 0.11 |

A precipitation time of at least 30 minutes, all other factors being constant, is desirable. Precipitates made in a shorter time than about 30 minutes under the conditions used tend to be too dense, and those made at a longer time than about 80 minutes tend to be quite voluminous. The preferred precipitates have (dried and powdered) bulk density in the range of 0.10 to 0.25 kgs./liter.

These preferred catalysts give results comparable to those set forth under Example I in the hydrogenation of glyceride oils.

EXAMPLE V SERIES

The aluminum content (expressed as % $Al_2O_3$) of the catalysts or the intermediates also influences their characteristics. This is illustrated by the following catalysts, prepared by the method of Example I, except that the amounts of alumina were varied, while keeping the amount of silicon (expressed as %SiO₂) fairly constant.

range of 2.5 to 4.0. The alkali carbonates include ammonium, potassium, and sodium car- Table E

| Catalyst Number | (13) | (14) | (15) | (16) |
|---|---|---|---|---|
| Catalyst Formula (in weight per cent): | | | | |
| Ni | 57.0 | 51.1 | 36.3 | 26.7. |
| Al₂O₃ | 0.0 | 4.4 | 15.8 | 23.1. |
| SiO₂ | 43.0 | 44.5 | 47.9 | 50.2. |
| Characteristics of Precipitate (Nickel-Alumino-Silicate): | | | | |
| Hardness | Hard, friable | Sl. Hard, friable | Soft, bulky | Soft, bulky. |
| Bulk Density of the Dried Powdered Precipitate (all through 120 mesh) (in kgs./liter) | 0.66 | 0.27 | 0.12 | 0.16. |
| Soybean Oil Hydrogenation Time (in minutes) | 70 | 45 | 33 | 27. |
| Catalyst Rating (Comparative to Standard): | | | | |
| Selectivity (in I. V. units) | −4.2 | +0.4 | +4.7 | +22.5. |
| Iso-Suppressivity (in I. V. units) | +1.0 | +1.9 | +2.5 | +0.8. |

The catalyst should contain an amount of nickel in the range of 15.0 to 50.0%. The nickel content should be in the range of 5 to 25, preferably 7 atomic weights, per formula weight Al₂O₃ in the catalyst. The Al₂O₃ content should be in the range of about 4.0 to about 16.0 parts by weight per 45 parts SiO₂ formula weight in the catalyst. The 8.1% Al₂O₃ of catalyst (1) (shown in Example I) is an optimum amount. The hydrogenation times given in the above table decrease as the amount of alumina is increased. The selectivity rating improves as the alumina content is increased; however, the iso-suppressivity rating goes up as the alumina content is increased to 15.8%, and then goes down markedly for the 23.1% alumina catalyst (16). Thus catalysts having an alumina content within the amounts of catalyst (14) to catalyst (15), inclusive, are preferred.

EXAMPLE VI SERIES

There is an optimum reduction temperature range, for reducing the precipitate to the active catalyst. This is illustrated by the following catalysts, prepared in accordance with the procedure set forth in Example I, except that the indicated temperatures were used in reducing the catalyst. The expeller soybean oil described in Table A was used in the following tests.

bonates and bicarbonates. The bicarbonates tend to give better precursors and catalysts from the standpoint of filterability.

The relative amounts of nickel salt and aluminum salt and alkali silicate and alkali carbonate used are selected to give catalysts having the desired nickel, alumina and silica content; i. e., a catalyst containing nickel in an amount in the range of 15.0 to 50.0%, a nickel content in the range of 5 to 25 atom weights per formula weight Al₂O₃, and an Al₂O₃ formula weight content in the range of 4.0 to 16.0 per 45 SiO₂ formula weights. The total amount of precipitating agent (alkali silicate plus alkali carbonate) is used in a slight stoichiometric excess, e. g., about 10% excess. The amount of precipitant should be sufficient to precipitate all the nickel, alumina and silica, but should not be so great as to redissolve precipitated alumina.

The temperature at which the alkali silicate and the alkali carbonate are gradually added is at least 75° C. and preferably at least 80° C. The upper limit is, of course, the boiling point of the liquid reaction mixture at the pressure employed; e. g., atmospheric pressure, or even elevated pressure if desired.

It is preferred to employ the nickel and aluminum salts solution in a concentration of about 5 to 30 parts (of both salts, calculated as an- Table F

| Catalyst Number | (17) | (18) | (19) | (20) | (21) | (22) | (23) |
|---|---|---|---|---|---|---|---|
| Reduction Temperature (in °C) | 375 | 425 | 450 | 475 | 525 | 550 | 600 |
| Hydrogenation Time (in minutes) | 36 | 38 | 35 | 31 | 27 | 46 | 40 |
| Color of Oil After Hydrogenation: | | | | | | | |
| Y | 4 | 5 | 6 | 4 | 3 | 4 | 4 |
| R | 0.4 | 0.5 | 0.6 | 0.4 | 0.3 | 0.4 | 0.4 |
| Catalyst Rating (Comparative to Standard): | | | | | | | |
| Selectivity (in I. V. units) | −0.7 | +2.2 | +3.4 | +2.4 | +1.5 | +2.5 | +1.1 |
| Iso-Suppressivity (in I. V. units) | −7.6 | +21.2 | +28.4 | +37.9 | +30.6 | −0.7 | +4.0 |

The above data indicate that a reduction temperature in the range of 425° to 525° C. or even to 550° C. is desirable, and a temperature in the range of 475° to 525° C. is preferred.

Comparable desirable ranges of reduction temperatures are also indicated by corresponding hydrogenations of refined cottonseed oil, using the above catalysts.

The water-soluble nickel and aluminum salts which are preferred are the chlorides and the nitrates, and the like sulfur-free salts. The sulfur-containing salts may be used, but tend to produce iso-promotive catalysts; and therefore require special treatment (by known methods) to remove the sulfur in order to give the more desirable catalysts. It is preferred to use a soluble alkali silicate containing per alkali oxide unit (e. g., Na₂O) a ratio of SiO₂ units in the hydrous) per 1000 parts of distilled water, preferably about 15 to 20 parts. It is preferred to employ an alkali silicate solution containing from about 5 to about 15 parts of the alkali silicate (calculated as anhydrous) in about 200 parts of distilled water, and a concentration of about 8 parts is especially preferred. It is preferred to employ an alkali carbonate solution containing from about 10 to about 25 parts of the carbonate (calculated as anhydrous) in about 800 parts of distilled water, a solution containing about 19 parts being especially preferred.

The time of addition of the total amount of precipitating agents should be at least 30 minutes. The upper limit should be low enough so as not to give a too voluminous catalyst precursor; and 2 hours is a general upper limit. A preferred upper limit is 80 minutes.

The precipitate or precursor of the catalyst is filtered and washed to remove all water-soluble salts therefrom, and then thoroughly dried at a temperature in the range of 105–110° C. It is then carefully pulverized to give a sufficiently fine powder so that it may be readily suspended in the glyceride oil with efficient turbine-type agitation; and yet not so fine that it cannot be readily filtered from the hydrogenated glyceride. It is preferred to pulverize it so that it will all pass through a standard 120 mesh screen. The palpable powder obtained is then reduced with pure hydrogen at an elevated temperature. A reduction temperature in the range of 425° to 550° C. is preferred. A reduction time of about one to two hours will generally be sufficient. The reduced catalyst is preferably mixed with a protection oil, such as refined and bleached coconut oil, or the like, while maintained in a non-injurious atmosphere, such as in an atmosphere of hydrogen, pure carbon dioxide or inert gas.

Part of the silica in the catalyst may be obtained from diatomaceous earth, in place of that obtained from the alkali silicate, in an amount of up to about 80% of the latter (i. e., of the total silica content), without adversely affecting the desirable attributes of the catalyst, to provide improved catalysts as to filtration.

The catalysts made in accordance with the foregoing descriptions give comparable results to those set forth in the above examples when used in hydrogenating and decolorizing glycerides or oils to form products having a minimum of unsaponifiable components and improved color and stability. The catalyst is readily and substantially completely removable from the hydrogenated and decolorized oil, e. g., by filtration, or equally convenient methods. Any glyceride oil containing a relatively high amount of unsaturated fatty acid radicals may be employed. The glycerides may be derived from vegetable, animal, or marine animal sources. They may also be obtained by synthetic or partially synthetic methods, including the reconstitution of natural glycerides to obtain products having desired fatty acid constituents.

In hydrogenating and decolorizing glyceride oils, the amount of catalyst used is such that it contains an amount of nickel in the range of 0.02 to 0.30% based on the weight of the glyceride.

The catalyst may be used repeatedly, and is very effective even after several runs. A desirable feature of the catalyst is its relatively low cost. The relatively small amounts used would entail a very small additional cost, if the catalyst were discarded after it becomes inactive. However, the nickel content may be recovered therefrom readily, and used in preparing a new batch of catalyst.

The invention contemplates those variations and modifications which are apparent to those skilled in the art in view of the foregoing disclosure, except as do not come within the appended claims.

I claim:

1. A process for hydrogenating and decolorizing refined, dark colored glyceride oils to form edible products having a minimum of unsaponifiable components and having acceptable improved color and stability, which comprises treating the oil at a temperature in the range of 100° to 200° C. with hydrogen at a pressure in the range of 1 to 3 atmospheres absolute, in the presence of a non-colloidal, particulate, nickel-alumina-silica catalyst containing an amount of nickel in the range of 15.0 to 50.0% and an equivalent alumina and silica content in the range of 4.0 to 16.0 $Al_2O_3$ formula weights per 45 $SiO_2$ formula weights, obtained by reducing a coprecipitated precursor, the amount of catalyst used being such as to contain an amount of nickel in the range of 0.02 to 0.30% Ni based on the weight of the oil, said catalyst being readily and substantially completely removable from the hydrogenated and decolorized oil by filtration.

2. The process of claim 1 wherein the co-precipitated precursor is obtained by forming an aqueous solution of a soluble nickel salt and a soluble aluminum salt, then gradually adding aqueous alkali metal silicate and then gradually adding a solution of an alkali carbonate.

3. The process of claim 2 wherein the alkali carbonate is sodium bicarbonate.

4. The process of claim 3 wherein the concentrations (calculated as anhydrous) of the respective aqueous salt solutions are about 5 to about 30 parts of both the nickel and aluminum salts per 1000 parts of distilled water, about 5 to about 15 parts of the alkali silicate per 200 parts of distilled water, and about 10 to about 20 parts of the carbonate per 800 parts of distilled water.

5. A process for hydrogenating and decolorizing refined, dark colored glyceride oils to form edible products having a minimum of unsaponifiable components and having acceptable improved color and stability, which comprises treating the oil at a temperature of 150° C. with hydrogen at atmospheric pressure, in the presence of an amount of a non-colloidal, particulate, nickel-alumina-silica catalyst containing an amount of nickel equal to 0.10% of the weight of the glyceride, said catalyst being obtained by reducing a co-precipitated precursor and containing 46.5% nickel, 8.1% alumina and 45.4% silica, and said catalyst being readily and substantially completely removable from the hydrogenated and decolorized oil by filtration.

6. The process of claim 5 wherein the precursor is obtained by dissolving 23.8 parts by weight of nickel chloride ($NiCl_2.6H_2O$) and 4.8 parts of aluminum chloride ($AlCl_3.6H_2O$) in 1000 parts of distilled water at 85° C., with rapid agitation, gradually adding thereto a solution of 19.2 parts of sodium silicate (38.9% $Na_2O \cdot 3.23$ $SiO_2$ and 61.1% $H_2O$) in 200 parts of distilled water, and then gradually adding a solution made up of 19.2 parts sodium bicarbonate ($NaHCO_3$) dissolved in 800 parts of distilled water, all at 85° C. with efficient agitation for a period in the range of 1 to 2 hours, and then filtering and washing with water, drying at 105–110° C. and pulverizing so that it will all readily pass through a standard 120-mesh screen.

7. A process for hydrogenating and decolorizing refined, dark colored glyceride oils to form edible products having a minimum of unsaponifiable components and having acceptable improved color and stability, which comprises treating the oil at a temperature of 150° C. with hydrogen at atmospheric pressure, in the presence of an amount of a non-colloidal, particulate, nickel-alumina-silica catalyst containing an amount of nickel equal to 0.10% of the weight of the glyceride, said catalyst being obtained by reducing a co-precipitated precursor and containing 46.5% nickel, 8.1% alumina, 22.6% silica and 22.8% diatomaceous earth, and said catalyst being readily and substantially completely removable from the hydrogenated and decolorized oil by filtration.

WILLIAM J. PATERSON.

REFERENCES CITED

The following references are of record in the file of this patent:

UNITED STATES PATENTS

| Number | Name | Date |
|---|---|---|
| 1,256,032 | Mittasch et al. | Feb. 12, 1918 |
| 1,970,695 | Freyermuth | Aug. 21, 1934 |
| 2,164,291 | Jenness | June 27, 1939 |
| 2,307,065 | Paterson | Jan. 5, 1943 |
| 2,311,633 | Blaso | Feb. 23, 1943 |
| 2,433,614 | Longley | Dec. 30, 1947 |